United States Patent [19]

Kurek

[11] Patent Number: 4,619,159

[45] Date of Patent: Oct. 28, 1986

[54] WRENCHING UNIT FOR USE IN POWER THREADING OF A SLEEVE PORTION TO A PIPE PORTION USED IN MAKEUP OF OIL WELL CASINGS OR THE LIKE

[76] Inventor: Stanley Kurek, Box 67, Fort Kent, Alberta, Canada

[21] Appl. No.: 724,666

[22] Filed: Apr. 18, 1985

[30] Foreign Application Priority Data

Feb. 4, 1985 [CA] Canada .................................. 473492

[51] Int. Cl.[4] ............................................. B25B 13/50
[52] U.S. Cl. .................................. 81/57.34; 81/57.16
[58] Field of Search ................. 81/57.16, 57.34, 57.36; 29/240

[56] References Cited

U.S. PATENT DOCUMENTS

| | | |
|---|---|---|
| 1,187,665 | 6/1916 | Simms . |
| 1,514,195 | 11/1924 | Brandon ............................ 81/57.16 |
| 1,907,461 | 5/1933 | Sunde . |
| 2,527,456 | 10/1950 | Schmeling . |
| 2,668,689 | 2/1954 | Cormany ............................ 81/57.16 |
| 3,507,174 | 4/1970 | Dickmann . |
| 3,916,500 | 11/1975 | Brown . |
| 4,092,881 | 6/1978 | Jurgens et al. ...................... 81/57.34 |
| 4,290,304 | 9/1981 | Eckel . |
| 4,437,218 | 3/1984 | Pridy . |
| 4,444,273 | 4/1984 | Ruby . |
| 4,494,425 | 1/1985 | Shewmake ........................ 81/57.34 |

FOREIGN PATENT DOCUMENTS 1115686 1/1982 Canada .
1126720 6/1982 Canada .

Primary Examiner—James G. Smith
Attorney, Agent, or Firm—Eric P. Schellin

[57] ABSTRACT

A wrenching unit for makeup or breakout of pipe sections to be used in an oil well casing. Each section is provided at one end with a coupling sleeve. Instead of a complex arrangement of backup tongs known from prior art, adapted to prevent rotation of the pipe section during of the makeup or breakout of the pipe joint, the backup tong assembly is suspended, preferably by a pair of tension springs, from a supporting frame section. The suspension thus allows the desired "floating" during the operation of the backup tong in radial or transverse direction and also longitudinally of the pipe, while achieving a significant simplification of the overall structure.

11 Claims, 5 Drawing Figures

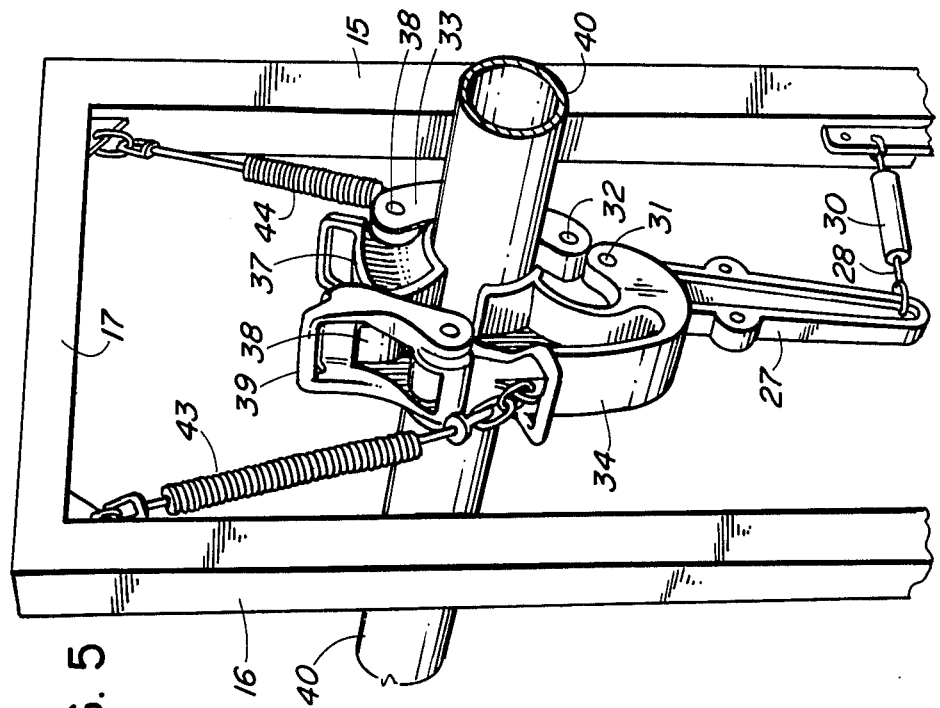
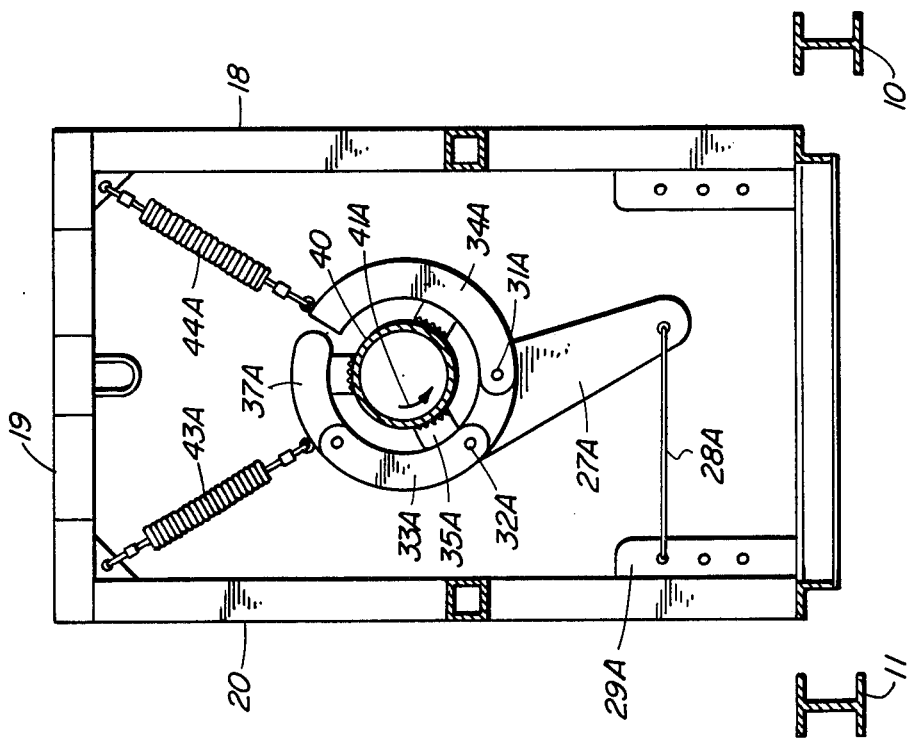
FIG. 5
FIG. 4

WRENCHING UNIT FOR USE IN POWER THREADING OF A SLEEVE PORTION TO A PIPE PORTION USED IN MAKEUP OF OIL WELL CASINGS OR THE LIKE

The present invention relates to a wrenching unit for use in Power threading of a sleeve portion to a pipe portion.

The field to which the present invention relates is also sometimes referred to as "bucking units", i.e. power devices adapted to threadably secure to one end of a pipe section a coupling collar. The collar is first applied manually to one end of the pipe portion. Then the collar is power threaded by the wrenching unit onto the pipe portion which is then stored for eventual makeup of oil well casings. The threaded sleeve forms a joint to which the threaded end of another pipe section is eventually secured when making up an oil well casing.

The makeup of a partial joint comprised of a threaded end of a pipe and of a sleeve is usually carried out in the field and is associated with several prerequisites. Firstly, the threaded joint is very tight so that power tools are required to achieve proper threaded connection. The thread of the pipe and of the sleeve should not become damaged or stripped by excessive force applied by the bucking unit. A typical bucking unit or wrenching unit comprises a power tong section which is adapted usually to engage the sleeve. Such section is associated with a drive which rotates the power tong section in a direction either to engage or to disengage a sleeve from a pipe section. The pipe section, in turn, is held by what is called a backup tong section. The purpose of the backup tong section is to allow relative turning of the sleeve and of the pipe in order to threadably engage each of the two. The backup tong section therefore has to be stationary, at least as far as the rotation about the axis of the pipe section is concerned. By the same token, there must be a certain degree of clearance in radial direction and also axially to allow certain displacements between the backup tong section to accommodate deviations from a straight, linear shape of pipe sections and also for deformations which may occur during the makeup of the respective end of the pipe section.

Many different machines of this type are known. They are basically characterized by an arrangement of a driven power tong section generally co-axial with a backup tong section. The difference between the backup tong section and the driven section is mainly in that the backup tong section is stationary, the basic function of the mechanism for engaging the respective cylindric surfaces being generally the same. Arrangements are also known wherein rotary hydraulic backups are provided. Typical power tongs of this type are also provided with torque gauges to prevent damage to the thread as referred to above.

The bucking or wrenching units of this type are relatively expensive and complex in structure and are relatively demanding from the standpoint of maintenance.

It is an object of the present invention to provide a wrenching unit of the above type which would produce reliable operation at reduced manufacturing costs and which would present further improvement of the "floating" feature of the backup unit with respect to the ideal axis of a pipe section to be made up or broken out by the device.

In general terms, the present invention provides a wrenching unit for use in applying a sleeve portion to a pipe portion, particularly for applying a collar portion on to an oil well casing tubular portion, said wrenching device comprising, in combination a power tong section including a drive unit for rotating said power tong section in a predetermined direction and clamp means for fixedly but releasably clamping the power tong section to one of said pipe portion and said sleeve portion, whereby the rotation of said power tong section can be transmitted to the first one of said portions; a backup tong section including clamping means for fixedly but releasably clamping the backup tong section to the other one of said portions; said power tong section and said backup tong section being secured to a supporting frame such that the power tong section and the backup tong section are so disposed relative to each other that the displacement of the power tong section relative to the backup tong section can be effected in a normally generally horizontal and axial direction and in virtually any transverse direction.

Preferably, the backup tong section includes clamp jaw sections hingedly secured to each other and operatively associated with clamp closing means adapted to selectively open or close said clamp to thus selectively engage or disengage the backup tong section with the respective portion, said clamp sections being suspended on flexible suspension means anchored in said supporting frame at a level above the clamp sections, whereby the clamp sections hang freely on said flexible suspension means to allow displacement of said backup tong section in said three directions.

More specifically, but still defining the invention in general terms, a wrenching unit is provided as set forth above which comprises two backup tong sections generally co-axial with each other, each backup tong section including clamp jaw sections hingedly secured to each other and operatively associated with clamp actuation means adapted to selectively open or close said clamp to thus selectively engage or disengage the backup tong section with the respective portion, said clamp sections being suspended on flexible suspension means anchored in said supporting frame at a level above the clamp sections, whereby the clamp sections hang freely on said flexible suspension means to allow displacement of said backup tong section.

A preferred embodiment of the present invention will now be described with reference to the accompanying drawings in which:

FIG. 4 is a simplified sectional view taken along the line IV—IV of FIG. 1;

FIG. 5 is a perspective view showing the front backup tong with its surroundings in greater detail.

Figure 1:
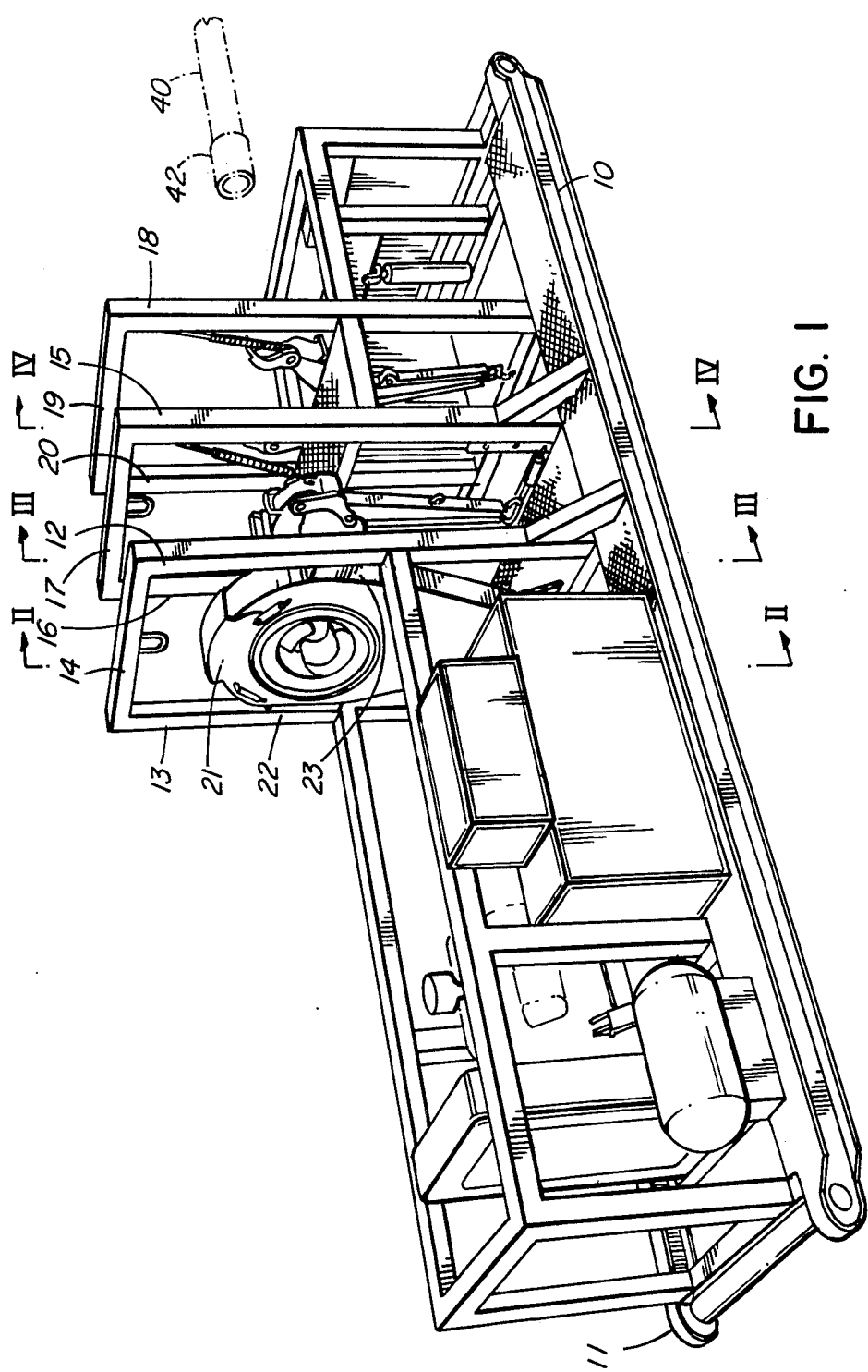
FIG. 1 is a simplified overall perspective view of a preferred embodiment of the present invention with certain parts of the unit omitted for the sake of clarity.

Reference should first be made to FIG. 1 showing the side view of a supporting frame for the present invention. The supporting frame includes a pair of longitudinal members 10, 11 which form the base of the supporting frame. Approximately at the center of the supporting frame, there is an upwardly elongated rectangular part of the supporting frame comprised of two uprights 12, 13 and a transverse member 14 spanning the upper, free ends of the uprights 12, 13. Spaced longitudinally from the first upright structure 12, 13, 14 is a second frame section comprised of two uprights 15, 16 connected on top by a transverse beam 17.

A third upwardly enlongated frame section includes, on the side of the longitudinal member 10, an upright 18 the upper end of which is connected by a transverse beam 19 with a second upright 20 disposed of the side of the longitudinal member 11. The structual configuration of the remainder of the supporting frame is apparent from FIG. 1 and comprises known elements which do not have to be described in greater detail.

The frame section comprised of uprights 12, 13 and the beam 14 supports a hydraulic head 21. The head is of a well known structural configuration which does not form a part of the present invention. Accordingly, the head 21 is shown only in a diagrammatic way. It will suffice for the purpose of understanding the present invention to realize that the head is mounted in two side pieces 22, 23 which secure the head 21 to the uprights 12 and 13. The head 21 further comprises hydraulic or mechanical arrangement whereby jaws of the head 21 can firmly grip a sleeve having generally smooth cylindric outer surface and provided with a suitable thread at the inside thereof. As is well known, the head 21 is provided with drive means for rotating the clamps or jaws such as to turn the sleeve, on actuation of the device, about the axis indicated with reference numeral 24 and coincident with longitudinal axis of the entire arrangement. Thus the opening 25 of the hydraulic head 21 includes a number of circumferentially spaced radially moved jaws 26. The jaws 26 are rotated by a hydraulic motor (not shown). The opening 25 is of a sufficiently large diameter as to permit a collar or sleeve of the pipe coupling to pass through and, on contraction of the jaws 26, to be firmly gripped in the hydraulic head 21 and rotated about the axis 24.

Figure 2:
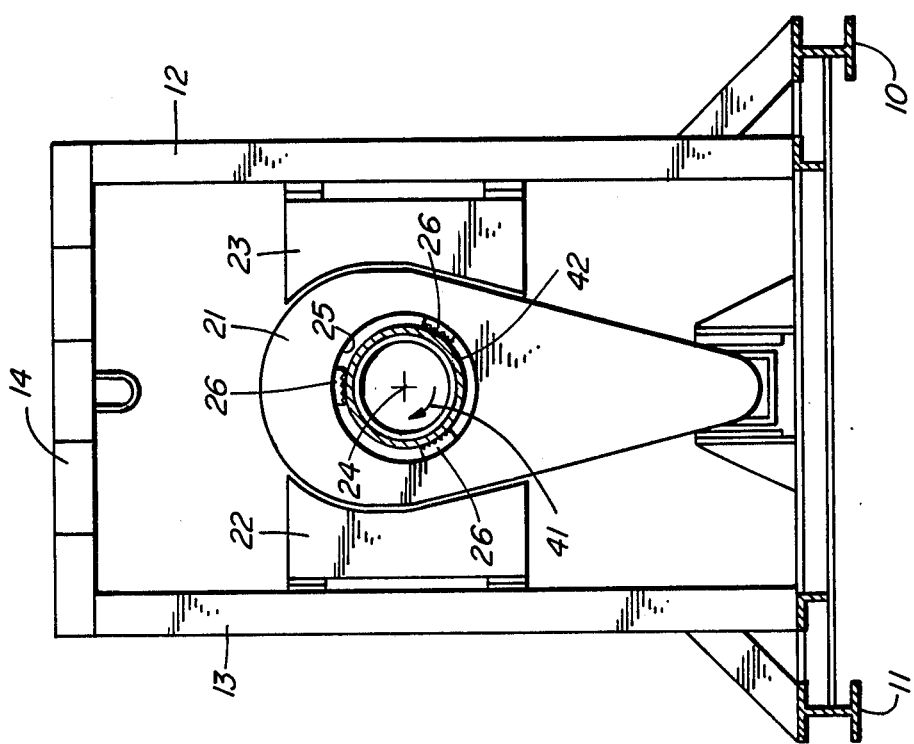
FIG. 2 is a simplified sectional view taken along the lines II—II of FIG. 1.

The arrangement in FIG. 2 can also be referred to as a power tong section including a drive unit for rotating the section in a predetermined direction and clamp means (the jaws 26) for fixedly but releasably clamping the power tong section to the respective sleeve portion whereby the rotation of the power tong can be transmitted to the sleeve. It is obvious that it is not totally impossible to arrange the power tong section to engage a respective pipe section but such embodiment is not preferred and would be unusual.

Figure 3:
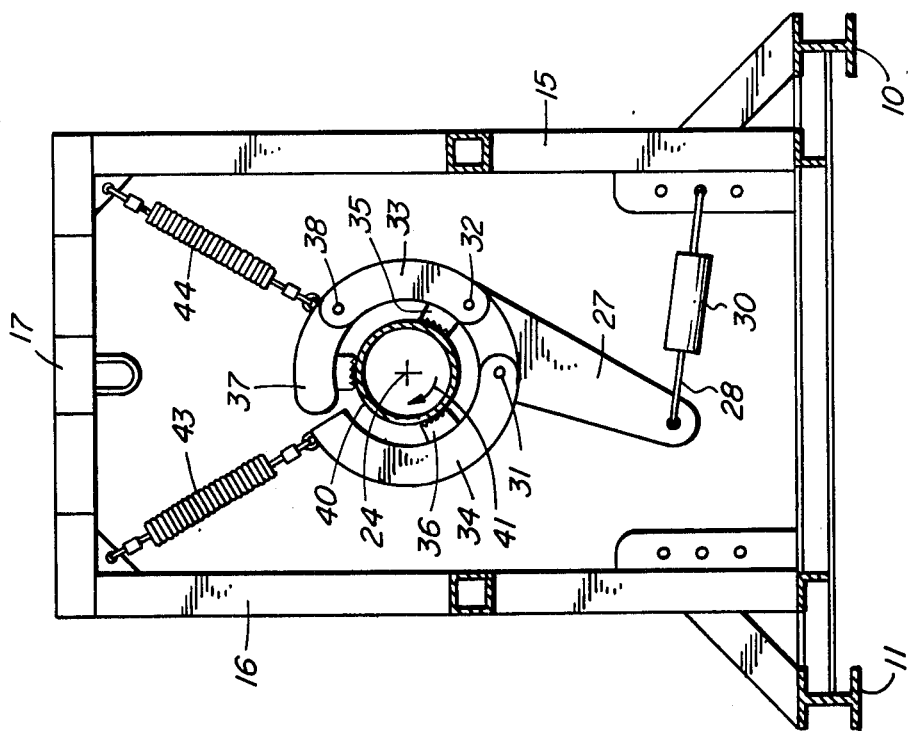
FIG. 3 is a simplified sectional view taken along the line III—III of FIG. 1.

Turning now to FIG. 3, a first backup tong section is shown. It comprises a downwardly dependent lever 27 whose lower, free end section is connected by a cable-like arrangement 28 to the reinforcement member 29 of the frame, at the upright 15 or at the side of the longitudinal member 10. The arrangement 28 preferably includes a tension sensing device 30. The tension sensing device 30 is well known in the art and does not have to be descriped in greater detail. It will suffice to say that it senses and transmits to a suitable location the instant tension applied to the first backup section. The upper end of the lever 27 is provided with two pivot pins 31, 32 which form a means for hinged securement of two links 33, 34. The link 33 is integral with a corrugated, internal jaw section 35 facing interiorly, while the link 34 has a similar internal jaw section 36. The links 34 and 33 are interconnected at their top ends with a locking link 37 which is hinged to the link 33 at a pivot pin 38. The structural arrangement of the locking link 37 is better apparent from FIG. 5 which shows that the link 37 is provided with an upwardly protruding stop 38 engageable with a yoke 39 pivotally secured to the free end of the link 34. It will be appreciated that on engagement of the yoke 39 with the stop 38 and the resulting snug surrounding of the pipe section 40 the overall assembly of links 33, 34 and 37 cooperates with the lever 27 such that it becomes self locking on application of torque at the pipe in the direction of arrow 41 in FIG. 3. Arrow 41 in FIG. 3 is directed clockwise indicating the direction of force which is transmitted to the pipe section 40 when power threading the threaded sleeve 42 onto an associated pipe section 40. The entire assembly of the links 33, 34 and 37 together with the tong section 27 is retained within the supporting frame by a pair of flexible suspension means of the type of tension spring means 43, 44. The tension spring means 43 is secured at its one end to the link 34, while its upper end is anchored to the supporting frame at a corner of the beam 17 and the upright 16. Similarly, the opposite tension spring 44 is secured at its one end to the link 33 (see FIG. 5 for details of the securement), while the opposite, upper end thereof is anchored to the supporting frame structure at the corner between the upright 15 and the transverse beam 17.

The entire first backup tong section thus actually "floats" within the supporting frame on springs 43 and 44. It allows displacement of the entire assembly in virtually any direction within the plane of the frame members 15, 16 and 17. It also allows displacement of the unit along the axis 24 due to the capability of springs 43 and 44 to stretch if necessary. In other words, the suspension by the springs 43, 44 provides an extremely simple arrangement allowing relative displacement of the backup tong section of FIG. 3 relative to the power tong section of FIG. 2 in horizontal and axial direction (i.e. the direction of axis 24) and simultaneously in any transverse direction, the latter being generally within or parallel with the plane defined by uprights 15 and 16 and transverse beam 17.

In operation, the thread of a sleeve such as the sleeve 42 is first manually placed onto the beginning of the thread at one end of a pipe portion of section 40. Then, the pipe section 40, with the sleeve 42 is inserted axially through the arrangement of the backup tongs to bring the sleeve 42 into the hydraulic head 21. Then, the backup tong section of FIG. 3 is closed by engaging the stop 38 with the yoke 39 whereby the joint link 37 assumes the position generally as shown in FIG. 3. The power turning of the hydraulic head tends to urge the displacement of pivot pins 31 and 32 such as to produce a self-clamping effect by the jaw sections 35 and 36 (and also the jaw section of the link 37) against the outer surface of the pipe section 40. The assembly of the backup tong section cannot rotate due to the securement through the cable-like means 28 to the reinforcement member 29 at the right-hand side of the frame as viewed in FIG. 3. On the other hand, it is allowed to move along the axis 24 and also in transverse direction, to accommodate any misalignments which may happen due to inaccuracies in the production of the pipe section or of the sleeve and also due to high forces active at the pipe section during the makeup operation as the sleeve 42 is power threaded onto the pipe section 40. By the same token, the sensor 30 controls instant tension and if the tension is too high (thus giving rise to the danger of damaging the joint by the stripping of the thread of the pipe and of the sleeve), an appropriate signal is given to the operator of the device to stop the drive of the hydraulic head. If, on the other hand, the tension is too low (due to deficiently loose tolerances in the threads of the sleeve and of the pipe section), another signal is provided to alert the operator that the required tightness of the thread is not present.

FIG. 4 shows a second backup tong section. As will be seen on comparison with FIG. 3, the second backup tong section is a mirror image of the arrangement of FIG. 3. It is only used if the force exerted upon the pipe section 40 is in the counter clockwise direction 41A. This occurs when the sleeve and the pipe section are being broken out or disassembled. Since the remaining portions of the second backup tong section are functional counterparts of the arrangements of FIG. 3, they are all referred to with the same reference numerals using index A. The lever 27A, for instance, is now secured by the cable-like arrangement 28A to the left-hand side reinforcement member 29A. Thus, the second backup tong section is operative only when it is necessary to disassemble a pipe section and a respective sleeve. Therefore, the cable-like arrangement 28A does not have to be provided with a torque sensor such as torque sensor 30.

Those skilled in the art will readily appreciate that the present invention provides an extremely simple and efficient power tong unit. The above description refers to a preferred embodiment which may be modified to a greater or lesser degree without departing from the scope of the present invention as set forth in the accompanying claims.

The embodiments of the invention in which an exclusive property or ptivilege is claimed are defined as follows:

1. A wretching unit for applying a threaded collar portion to a threaded end of a tubular portion for use in an oil well casing, said wrenching device comprising, in combination:
   (a) a power tong section including a drive unit for rotating said power tong section about a generally horizontal axis of rotation in a predetermined direction and clamp means for fixedly but releasably clamping the power tong section to one of said tube portion and said sleeve portion to transmit the rotation of said power tong section to a first one of said portions in order to thread or release same onto or from the other one of said portions;
   (b) backup tong means including a backup tong section generally coincident with said axis and comprising clamping means for fixedly but releasably clamping the backup tong section to the other one of said portions, and anchoring means adapted to prevent rotation of the backup tong section when the backup tong section is engaged with the other one of said portions about said axis;
   (c) said power tong section and said backup tong section being secured to a supporting frame such that the power tong section and the backup tong section are displaceable relative to each other, referring to the said axis in (1) a normally generally horizontal and axial direction, (2) in a normally generally horizontal and radial direction, and (3) in a normally generally vertical and radial direction when the tong sections are engaged with the sleeve portion and with the tube portion, respectively.

2. A wrenching unit as claimed in claim 1, wherein the backup tong section includes clamp jaw sections hingedly secured to each other and operatively associated with clamp actuation means adapted to selectively open or close said clamp jaw sections to thus selectively engage or disengage the backup tong section with the respective portion, said clamp jaw sections being suspended on resiliently extensible and contractable suspension means anchored in said supporting frame at a level above the clamp jaw sections, whereby the clamp jaw sections hang freely on said suspension means to allow displacement of said backup tong section in said directions when the backup tongue section is engaged with the other one of said portions.

3. A wrenching unit as claimed in claim 2, wherein the suspension means includes a pair of flexible tension spring means, each having an upper end anchored at a section of said supporting frame, and a lower end secured to the respective clamp jaw section.

4. A wrenching unit as claimed in claim 2, wherein the clamp jaw sections are hingedly secured to each other at an upper end of a downwardly dependent lever, the lower, free end of the lever being secured to the supporting frame to thus form said anchoring means.

5. A clamping unit as claimed in claim 4, wherein the free end of the lever is secured to the supporting frame at one side thereof by a connecting cable-like device adapted to become tensioned when preventing the pivotal movement of the jaw sections about the said axis in a predetermined direction.

6. A wrenching unit as claimed in claim 1, wherein said backup tong means comprises two backup tong sections both adapted to engage the same one of said portions, said backup tong sections being generally co-axial with each other, each backup tong section including clamp jaw sections hingedly secured to each other and operatively associated with clamp actuation means adapted to selectively open or close the respective clamp to thus selectively engage or disengage the respective backup tong section with the respective portion, said clamp sections being suspended on resiliently extensible and contractable suspension means anchored in said supporting frame at a level above the respective clamp sections, whereby each clamp section hangs freely on its suspension means to allow displacement of the respective backup tong section in said directions.

7. A wrenching unit as claimed in claim 6, wherein the suspension means of each backup tong section includes a pair of flexible tension spring means, each having an upper end anchored at a respective overhead frame section of said supporting frame, and a lower end secured to the respective clamp jaw sections.

8. A wrenching unit as claimed in claim 6, wherein the clamp jaw sections of each backup tong sections are hingedly secured to each other at an upper end of a downwardly dependent lever, the lower, free end of the lever being secured to the supporting frame to limit pivotal movement of the respective jaw sections about the axis of the respective tubular or sleeve portion, the arrangement of the tong and of the jaw sections of one backup tong section being generally a mirror image of the tong and of the jaw sections of the other backup section, whereby one tong prevents the rotation of the associated portion in a first direction, while the other tong prevents the rotation of the associated portion in a second direction opposite to the first direction.

9. A wrenching unit as claimed in claim 8, wherein the free end of one lever is secured to the supporting frame at one side thereof by a first connecting cable-like device adapted to become tensioned when preventing pivotal movement of its associated jaw sections about the said axis in a first direction, while the free end of the other lever is secured to the supporting frame at the other side thereof by a second connecting cable-like device adppted to become tensioned when limiting the pivotal movement of its associated jaw sections in a second direction, opposite to said first direction.

10. A wrenching unit as claimed in claim 5, wherein said cable-like device includes tension sensing means adapted to sense instant tension in said cable-like device.

11. A wrenching unit as claimed in claim 9, wherein the cable-like device, which is tensioned when the respective tube portion and sleeve portion are being power threaded onto each other, its provided with tension sensing means adapted to sense instant tension in said cable-like device.

* * * * *